United States Patent [19]

Gouin et al.

[11] 3,762,952

[45] Oct. 2, 1973

[54] REMOVAL OF VINYLBENZYLHALIDE POLYMERIC DEPOSITS FROM SURFACES

[75] Inventors: Albert J. Gouin, Bay City; Richard H. Hall, Midland, both of Mich.

[73] Assignee: The Dow Chemical Company, Midland, Mich.

[22] Filed: Oct. 30, 1972

[21] Appl. No.: 302,232

[52] U.S. Cl. .......................... 134/38, 134/1, 134/6, 134/22 C, 252/153, 252/162, 252/548, 252/559, 260/91.5
[51] Int. Cl. ........................... B08b 3/08, B08b 3/10
[58] Field of Search ...................... 134/38, 37, 22 C; 252/548, 559, DIG. 8, 153, 154, 162

[56] References Cited
UNITED STATES PATENTS

| | | | |
|---|---|---|---|
| 3,179,609 | 4/1965 | Morison | 260/28 |
| 2,433,517 | 11/1943 | Kuentzel | 252/154 |
| 3,189,552 | 6/1965 | Sims | 252/153 |
| 2,750,343 | 6/1956 | Beber | 252/153 |
| 3,663,447 | 5/1972 | Murphy | 252/156 |

FOREIGN PATENTS OR APPLICATIONS

| | | | |
|---|---|---|---|
| 834,707 | 5/1960 | Great Britain | 134/38 |

*Primary Examiner*—Morris O. Wolk
*Assistant Examiner*—Dale Lovercheck
*Attorney*—William M. Yates et al.

[57] ABSTRACT

Deposits of polymer on the surfaces of process equipment used for the manufacture of vinylbenzyl halides are removed by contacting the fouled surfaces with a mixture of aqueous tertiary amine and a polymer-swelling solvent, i.e., chlorinated hydrocarbon or aromatic hydrocarbon and separating the thereby loosened deposits by means such as ultrasonic vibrations or a water wash.

5 Claims, No Drawings

REMOVAL OF VINYLBENZYLHALIDE POLYMERIC DEPOSITS FROM SURFACES

BACKGROUND OF THE INVENTION

This invention relates to a method for removing polymeric deposits from the surfaces of process equipment. It relates particularly to such a method as applied to equipment used in the manufacture of vinylbenzyl halide monomers.

In the manufacture of monomers such as vinylbenzyl chloride, particulary in the course of purification by distillation, small deposits of monomer-insoluble, strongly adherent polymer form on surfaces of equipment such as heat exchangers, distillation columns, and distillation column packing. These polymeric deposits gradually build up and cause increasing problems of heat transfer, resistance to flow, and the like. The equipment thus has to be shut down periodically and the deposits removed. Conventionally, removal of such deposits has been accomplished by softening or dissolving them by the use of solvents or corrosive chemical reagents. In some cases, as with distillation column packing, the fouled packing can be heated to a high temperature in air to burn off the deposits. In some cases, the packing may simply be thrown away it if is an inexpensive material and if the fouled packing can be removed.

None of the above expedients is entirely satisfactory in the case of monomers such as vinylbenzyl chloride and similar compounds. Although the polymer deposit is swellable and partially soluble in organic solvents, solvent treatment causes a mass gelation with further plugging and obstruction of flow so that the swollen material is almost impossible to remove from apparatus where access is limited such as in a distillation column. If it is attempted to burn out the polymer, relatively high temperatures are required. Rings of perforated titanium sheet are a preferred inert packing with good heat transfer for use in distilling vinylbenzyl chloride, for example, and such burning out procedure oxidizes and embrittles this metal packing. It is obviously impractical to discard such packing when it becomes coated with polymer.

SUMMARY OF THE INVENTION

It has now been found that polymer deposits can readily be stripped from the surfaces of process equipment used in the manufacture of vinylbenzyl halides and substituted vinylbenzyl halide monomers by contacting the polymer deposits with a mixture of a polymer-swelling organic solvent and the aqueous solution of a tertiary amine capable of forming a quaternary salt. Apparently, the insoluble portion of the polymer is solubilized by reaction of the amine with active chloromethyl groups to a sufficient extent to dissolve part of the polymer deposit and so loosen the rest of the polymer so that it is easily dislodged and washed from the column packing or other equipment surface, for example, by ultrasonic vibration or other mechanical agitation, turbulent liquid flow, or combination thereof. The washing can be done with water since the quaternary salts are water swellable.

DETAILED DESCRIPTION

This process is principally applicable as a practical matter to the manufacture, particularly to the distillation, of vinylbenzyl chloride, but it is similarly effective in the case of other vinylbenzyl halides such as the fluoride, bromide, or iodide and such halides substituted on the aromatic ring with one or more halogen or lower alkyl groups, for example, 2-methyl-4-vinylbenzyl chloride, 4-bromo-3-vinylbenzyl bromide, 3-ethyl-5-vinylbenzyl chloride, divinylbenzyl chloride, ar-bis(-chloromethyl)styrene, and the like.

Tertiary amines which are particularly preferred in the process include lower alkylamines such as trimethylamine, triethylamine, N-methyldiethylamine, and triisopropylamine. Also operable in the same way are hydroxyamines such as tri-ethanolamine, N-methyldiethanolamine, and the like, also cyclic amines such as N-methylpiperidine and N-methylpyrrole. Since water is an essential element in the process, the lower alkyl amines particularly are conveniently used as their aqueous solutions.

Polymer-swelling solvents suitable for use in the process include aromatic hydrocarbons and chlorinated hydrocarbons. Aromatic hydrocarbons such as benzene, toluene, and xylene are all operable, for example.

Suitable chlorinated hydrocarbon solvents of particular interest for this use are the lower aliphatic, lower boiling compounds such as methylene chloride, carbon tetrachloride, 1,1,1-trichloroethane, and 1,2-dichloroethylene. Other such solvents with somewhat higher boiling points can be used with good results, but these may be less desirable because of the higher temperatures necessary to remove them from the cleaned apparatus. These include perchloroethylene, 1,1,2-trichloroethane, and chlorobenzene.

The relative quantities of the above materials are not critical elements in the process so long as each is present in significant proportion. Obviously, at least enough amine should be used to quaternize and thereby solubilize essentially all of the chloromethyl groups in the polymer deposits. Ordinarily, all are used in considerable excess, particularly water which is preferred for flushing out the swollen and loosened remnants of the polymer deposits. Any convenient mechanical means can be employed for completing the separation of the partially dislodged polymer after the chemical treatment. This can range from brushing an accessible surface such as the inside of a condenser or distillation pot to ultrasonic vibrations applied to a packed distillation column.

The temperature for the cleaning process is also noncritical. Ordinarily, ambient temperature is preferred, but temperatures up to the boiling point of the cleaning mixture are suitable and may be desirable in some cases. Similarly, the time required for adequate softening and solubilizing of the polymer by the contacting water-amine-solvent mixture may vary considerably, depending upon the temperature and the thickness of the deposits. Contact times of 1 to 4 hours are illustrative.

EXAMPLE 1

In a four ounce bottle, about fifty polymer-encrusted protruded titanium sheet ⅛ inch × ¼ inch rings from a distillation column used for the separation of a m-p-vinylbenzyl choloride mixture from related impurities in a crude reaction product were soaked overnight at room temperature in a mixture of about equal volumes of methylene chloride and 25 percent aqueous trimethylamine. During this time, part of the polymer was dissolved and the rest was swollen and loosened from the pieces of column packing. The bottle was then put in an ultrasonic bath whereupon the remaining solid polymer was completely loosened and was easily separated from the metal pieces with a water wash.

EXAMPLE 2

A length of pipe in which the inside surface was badly encrusted with vinylbenzyl chloride process polymer was soaked in a mixture of methylene chloride and aqueous trimethylamine essentially as described in Example 1. The swollen and loosened polymer encrustations were then easily removed and the pipe was fully cleared by the action of a stream of water.

EXAMPLES 3-4

The procedure of Example 1 was repeated to clean vinylbenzyl chloride process polymer from titanium Pall rings used in the distillation column using perchloroethylene and methylchloroform respectively in place of the methylene chloride. In each case, the rings were efficiently and thoroughly cleaned.

COMPARATIVE EXAMPLES

Polymer-encrusted rings and equipment as described in the foregoing examples were treated with various corrosive reagents in attempts to remove the polymer deposits. Concentrated aqueous sodium hydroxide, nitric acid, chromic acid cleaning solution, aqua regia, and mixtures of nitric acid with sulfuric acid and with hydrofluoric acid were all tried without obtaining effective cleaning.

We claim:

1. A method for stripping, from process equipment used in the manufacture of vinylbenzyl halide and substituted vinylbenzyl halide monomers, the polymers of these monomers, which comprises contacting said polymers with a mixture of an aromatic hydrocarbon solvent or a chlorinated hydrocarbon solvent and the aqueous solution of a tertiary amine capable of forming a quaternary salt.

2. The method of claim 1 wherein the vinylbenzyl halide is vinylbenzyl chloride.

3. The method of claim 2 wherein the solvent is a chlorinated lower aliphatic hydrocarbon.

4. The method of claim 3 wherein the solvent is methylene chloride.

5. The method of claim 4 wherein the amine is trimethylamine.

* * * * *